US 8,227,541 B2
(12) United States Patent
Stoll et al.

(10) Patent No.: US 8,227,541 B2
(45) Date of Patent: Jul. 24, 2012

(54) ADDITIVE MIXTURES

(75) Inventors: Klaus Stoll, Binzen (DE); Urs Hirt, Muttenz (CH); Judy Van De Langkruis, Gempen (CH)

(73) Assignee: BASF SE, Ludwigshafen (DE)

( * ) Notice: Subject to any disclaimer, the term of this patent is extended or adjusted under 35 U.S.C. 154(b) by 771 days.

(21) Appl. No.: 12/317,021

(22) Filed: Dec. 18, 2008

(65) Prior Publication Data

US 2009/0111719 A1   Apr. 30, 2009

Related U.S. Application Data

(63) Continuation of application No. 10/573,848, filed as application No. PCT/EP2004/052263 on Sep. 22, 2004, now abandoned.

(30) Foreign Application Priority Data

| Oct. 1, 2003 | (EP) | 03103633 |
| Oct. 7, 2003 | (EP) | 03103714 |
| Oct. 20, 2003 | (EP) | 03103871 |
| Jun. 18, 2004 | (EP) | 04102809 |

(51) Int. Cl.
C08L 23/12 (2006.01)
C08L 23/14 (2006.01)
C08K 5/06 (2006.01)
C08K 5/20 (2006.01)
C08K 5/10 (2006.01)

(52) U.S. Cl. ........ 524/583; 524/582; 524/584; 524/108; 524/110; 524/109; 524/107; 524/369; 524/366; 524/210; 524/221; 524/222; 524/223; 524/224; 524/227; 524/228; 524/229; 524/487; 524/490; 524/291; 524/290; 524/299; 524/311; 524/308; 524/310

(58) Field of Classification Search .............. 524/366, 524/189, 227, 583, 369, 108
See application file for complete search history.

(56) References Cited

U.S. PATENT DOCUMENTS

| 3,773,722 A | 11/1973 | Dexter ........... 260/45.75 |
| 5,331,019 A | 7/1994 | Payne, Jr. et al. ........ 522/75 |
| 5,356,948 A | 10/1994 | Payne, Jr. et al. ........ 522/75 |
| 5,856,385 A | 1/1999 | Mehrer et al. ........... 524/108 |
| 5,958,319 A | 9/1999 | Brant ........... 264/177.19 |
| 6,299,801 B1 * | 10/2001 | Handa et al. ........... 252/511 |
| 6,300,398 B1 | 10/2001 | Jialanella et al. ....... 524/275 |
| 6,469,088 B1 * | 10/2002 | Lee ........... 524/451 |
| 6,518,339 B1 | 2/2003 | Sheppard et al. ........ 524/191 |
| 6,610,765 B1 | 8/2003 | Pfaendner |
| 6,824,865 B1 | 11/2004 | Funaoka et al. ....... 428/315.5 |
| 6,842,103 B2 | 1/2005 | Yoshinari et al. ........ 338/22 |
| 2003/0073764 A1 | 4/2003 | Zhao ........... 524/108 |
| 2004/0063830 A1 | 4/2004 | Schmidt et al. ......... 524/191 |
| 2005/0203226 A1 | 9/2005 | Mader et al. ........... 524/210 |
| 2005/0288510 A1 | 12/2005 | Mader et al. ........... 546/186 |

FOREIGN PATENT DOCUMENTS

| EP | 565 868 A2 * | 10/1993 |
| EP | 911365 | 4/1999 |
| EP | 0962459 | 12/1999 |
| FR | 2 917 741 A1 * | 12/2008 |
| JP | 4-153240 | 5/1992 |
| JP | 2002/534574 T | 10/2002 |
| WO | WO 96/27885 A1 * | 9/1996 |
| WO | 00/20492 | 4/2000 |
| WO | 02/14045 | 2/2002 |

OTHER PUBLICATIONS

Nakagawa et al., J. Chromatography A, 1983, 260, 391-409.*
Honeywell AC9A Wax—product data sheet, Jun. 2010.*
Honeywell AC6 Wax—product data sheet, Jun. 2010.*
Patent Abstracts of Japan 04-153240 printed on Dec. 9, 2010.
Patent Abstracts of Japan Publication No. 60042385, Publication Date Aug. 19, 1983.

* cited by examiner

Primary Examiner — Rip A. Lee
(74) Attorney, Agent, or Firm — Tyler A. Stevenson

(57) ABSTRACT

An additive mixture containing the components (A), (B) and optionally (C), wherein component (A) is at least one compound of the formula (I)

$$(I)$$

wherein
p is zero or 1;
m and n are independently of one another an integer from zero to 3; and
the radicals R are independently of one another $C_1$-$C_8$alkyl, $C_1$-$C_8$alkoxy, hydroxy, halogen, $C_1$-$C_8$alkylthio, $C_1$-$C_8$alkylsulfoxy or 2 radicals R form together with 2 adjacent carbon atoms of the unsaturated parent ring a 5- to 7-membered carbocyclic or heterocyclic ring;
component (B) is at least one compound of the formula (II)

$$(II)$$

wherein
x and y are independently of one another an integer from 2 to 10;
the radicals $A_1$, $A_2$ and $A_3$ are independently of one another $C_1$-$C_{10}$alkyl, $C_5$-$C_{12}$cycloalkyl unsubstituted or substituted by 1 to 3 $C_1$-$C_{10}$alkyl; phenyl unsubstituted or substituted by 1 to 3 $C_1$-$C_{10}$alkyl; or $C_7$-$C_{12}$phenylalkyl, and the radicals $A_2$ and $A_3$ are additionally hydrogen;
with the proviso that at least one of the radicals $A_1$ and $A_2$ is branched $C_3$-$C_{10}$alkyl, $C_5$-$C_{12}$cycloalkyl unsubstituted or substituted by 1 to 3 $C_1$-$C_{10}$alkyl; phenyl unsubstituted or substituted by 1 to 3 $C_1$-$C_{10}$alkyl; or $C_7$-$C_{12}$phenylalkyl; and
component (C) is a lubricant or a mixture of lubricants.

7 Claims, No Drawings

ADDITIVE MIXTURES

This application is a continuation of application Ser. No. 10/573,848, filed Mar. 29, 2006 abandoned, which is a 371 of international application No. PCT EP/2004/052263, filed Sep. 22, 2004, the contents of which applications are incorporated by reference.

The present invention relates to an additive mixture containing a sorbitol derivative, a hydrazine derivative and optionally a lubricant and/or an antioxidant, as well as to an additive mixture containing a sorbitol derivative and a lubricant, to the use of said additive mixtures as clarifying agents for polypropylene homo or copolymers and to polypropylene homo or copolymers containing the described additive mixtures.

Mixtures containing nucleating agents and waxes are described for example in EP-A-476,401, U.S. Pat. No. 5,958, 319, U.S. Pat. No. 6,300,398 and U.S. Pat. No. 5,856,385. Phenyl-alkanoyl-hydrazines are described for example in U.S. Pat. No. 3,773,722. A reaction product of dibenzylidene sorbitol with phenylhydrazine or its derivative is described for example in the abstract of JP-A-60/042,385. A polyolefin composition comprising a dibenzylidene sorbitol compound and a specific hydrazide is described for example in U.S. Pat. No. 6,518,339. Polypropylene compositions are described for example in WO-A-02/46,300.

The polypropylene homo or copolymers containing the additive mixtures of the present invention exhibit excellent optical properties at considerably reduced side effects (such as discoloration, emission of malodorants, migration or plate-out of low-molecular weight substances etc.) originating e.g. from the additives or any transformation products of the same.

The present invention relates in particular to an additive mixture containing the components (A), (B) and optionally (C), wherein
component (A) is at least one compound of the formula (I)

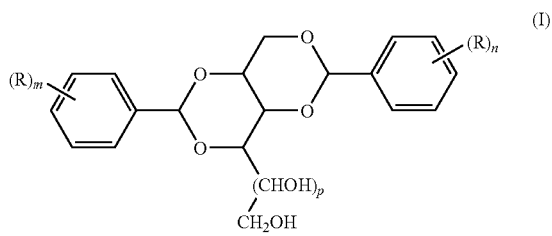

wherein
p is zero or 1;
m and n are independently of one another an integer from zero to 3; and
the radicals R are independently of one another $C_1$-$C_8$alkyl, $C_1$-$C_8$alkoxy, hydroxy, halogen, $C_1$-$C_8$alkylthio, $C_1$-$C_8$alkylsulfoxy or 2 radicals R form together with 2 adjacent carbon atoms of the unsaturated parent ring a 5- to 7-membered carbocyclic or heterocyclic ring;
component (B) is at least one compound of the formula (II)

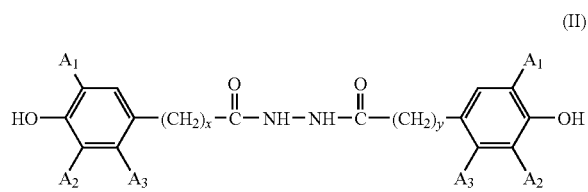

wherein
x and y are independently of one another an integer from 2 to 10;
the radicals $A_1$, $A_2$ and $A_3$ are independently of one another $C_1$-$C_{10}$alkyl, $C_5$-$C_{12}$cycloalkyl unsubstituted or substituted by 1 to 3 $C_1$-$C_{10}$alkyl; phenyl unsubstituted or substituted by 1 to 3 $C_1$-$C_{10}$alkyl; or $C_7$-$C_{12}$phenylalkyl, and
the radicals $A_2$ and $A_3$ are additionally hydrogen;
with the proviso that at least one of the radicals $A_1$ and $A_2$ is branched $C_3$-$C_{10}$alkyl, $C_5$-$C_{12}$cycloalkyl unsubstituted or substituted by 1 to 3 $C_1$-$C_{10}$alkyl; phenyl unsubstituted or substituted by 1 to 3 $C_1$-$C_{10}$alkyl; or $C_7$-$C_{12}$phenylalkyl; and
component (C) is a lubricant or a mixture of lubricants.

The combination of components (A) and (B) may show a synergistic effect.

The products described as component (A), (B) or (C) are commercially available and can be prepared in analogy to known methods, for example as described in U.S. Pat. No. 5,023,354, U.S. Pat. No. 5,198,484, U.S. Pat. No. 3,660,438 and U.S. Pat. No. 3,773,722.

Examples of alkyl having up to 10 carbon atoms are methyl, ethyl, linear or branched propyl, butyl, pentyl, hexyl, heptyl, octyl, nonyl and decyl. A preferred meaning of R is $C_1$-$C_4$alkyl, in particular methyl. A preferred meaning of $A_1$ and $A_2$ is branched $C_3$-$C_{10}$alkyl, in particular tert-butyl or 1,1-dimethylpropyl. $A_1$ and $A_2$ as tert-butyl are especially preferred.

Preferred meanings of $A_3$ are hydrogen and methyl.

Examples of $C_1$-$C_8$alkoxy are methoxy, ethoxy, propoxy, butoxy, pentyloxy, hexyloxy, heptyloxy and octyloxy. Methoxy is particularly preferred.

Examples of $C_1$-$C_8$alkylthio are methylthio, ethylthio, propylthio, butylthio, pentylthio, hexylthio, heptylthio and octylthio.

Examples of $C_1$-$C_8$alkylsulfoxy are methylsulfoxy, ethylsulfoxy, propylsulfoxy, butylsulfoxy, pentylsulfoxy, hexylsulfoxy, heptylsulfoxy and octylsulfoxy.

Examples of $C_5$-$C_{12}$cycloalkyl unsubstituted or substituted by 1 to 3 $C_1$-$C_{10}$alkyl are cyclopentyl, cyclohexyl, cycloheptyl, cyclooctyl and methylcyclohexyl.

An example of phenyl substituted by 1 to 3 $C_1$-$C_{10}$alkyl is methylphenyl.

Examples of $C_7$-$C_{12}$phenylyalkyl are benzyl and 2-phenyl-prop-2-yl.

An example of the formula (I) wherein 2 radicals R form together with 2 adjacent carbon atoms of the unsaturated parent ring a 5- to 7-membered carbocyclic or heterocyclic ring is

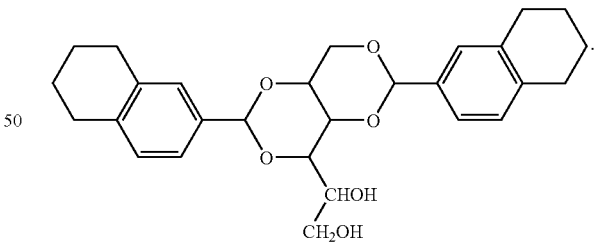

According to a preferred embodiment of the present invention
p is 1;
m and n are independently of one another zero, 1 or 2; and
the radicals R are independently of one another $C_1$-$C_4$alkyl;
x and y are independently of one another an integer from 2 to 6;
the radicals $A_1$, $A_2$ and $A_3$ are independently of one another $C_1$-$C_5$alkyl, cyclohexyl unsubstituted or substituted by one methyl; phenyl unsubstituted or substituted by one methyl; or 2-phenylpropyl, and
$A_3$ is additionally hydrogen.

According to a further preferred embodiment component (A) is at least one compound of the formulae (I-1), (I-2) and (I-3), and

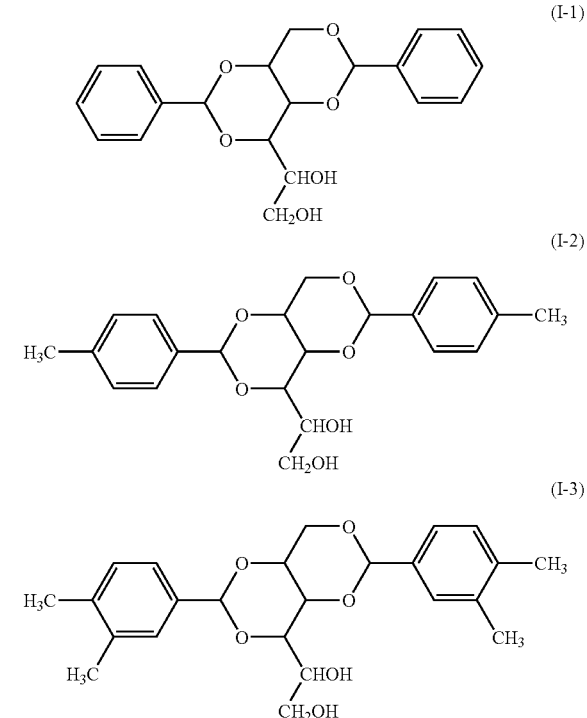

component (B) is the compound of the formula (II-1).

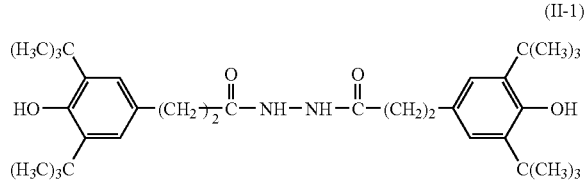

The compound of the formula (I-1) is commercially available as IRGACLEAR D®.

The compound of the formula (I-2) is commercially available as IRGACLEAR DM®.

The compound of the formula (I-3) is commercially available as MILLAD 3988®.

The compound of formula (II-1) is commercially available as IRGANOX MD 1024®.

Component (C) is preferably at least one lubricant selected from the group consisting of synthetic or natural waxes and amides of fatty acids. A comprehensive definition and review on waxes is given, for example, in Ullmann's Encyclopedia of Industrial Chemistry, Vol. A-28, VCH Verlagsgesellschaft mbH, D-69451 Weinheim, 1996 (in particular, see pages 104 ff. therein), which is incorporated herewith by reference.

Preferably suited are synthetic waxes, most preferably fully synthetic waxes of low polarity. Examples are Fischer-Tropsch waxes, high-pressure polyethylene waxes, Ziegler-Natta polyethylene waxes, metallocene polyethylene waxes and Ziegler-Natta polypropylene waxes.

A most suitable commercially available Fischer-Tropsch wax is for example AdSperse 868®, available from SASOL, Republic of South Africa.

Most suitable polyolefin waxes have preferably a molecular weight $M_w$ of more than 800 g/mol and less than 20,000 g/mol.

Examples of suitable natural waxes are refined esters of montan wax and decolorized paraffin waxes.

Examples of fatty acid amides are stearamide, erucamide and oleamide which are commercially available as Atmer SA 1750®, Atmer SA 1753®, respectively Atmer SA 1756®, Atmer SA 1758® and Atmer SA 1759®.

Component (C) is in particular at least one lubricant selected from the group consisting of Fischer-Tropsch wax, high-pressure polyethylene wax, Ziegler-Natta polyethylene wax, metallocene polyethylene wax, Ziegler-Natta polypropylene wax, natural waxes and amides of fatty acids.

A most particularly preferred embodiment of the present invention relates to an additive mixture wherein component (A) is at least one compound of the formulae (I-1), (I-2) and (I-3) as defined above;

component (B) is the compound of the formula (II-1) as defined above; and component (C) is at least one lubricant selected from the group consisting of Fischer-Tropsch wax, high-pressure polyethylene wax, Ziegler-Natta polyethylene wax, metallocene polyethylene wax, Ziegler-Natta polypropylene wax and stearamide, erucamide and oleamide.

Examples of specific additive mixtures of the present invention are

1. Compound of the formula (I-1)+compound of the formula (II-1)+a Fischer-Tropsch wax (e.g. AdSperse 868®, AdSperse 500®, AdSperse 100®, EnHance® or EnHance FG®).
2. Compound of the formula (I-1)+compound of the formula (II-1)+a Ziegler-Natta polyethylene wax (e.g. Licowax PE 130®, Licowax PE 190® or Licowax PE 520®).
3. Compound of the formula (I-1)+compound of the formula (II-1)+a high pressure polyethylene wax (e.g. Licowax PE 810®, Licowax PE 820®, Licowax PE 830®, Licowax PE 840®, Epolene C 10®, Epolene C 14®, Epolene C 15®, Epolene C 16®, Epolene C 17®, Epolene C 18®, Epolene N 15®, Epolene N 20® or Epolene N 34®).
4. Compound of the formula (I-1)+compound of the formula (II-1)+a metallocene polyethylene wax.
5. Compound of the formula (I-1)+compound of the formula (II-1)+a Ziegler-Natta polypropylene wax (e.g. Licowax PP 230®).
6. Compound of the formula (I-1)+compound of the formula (II-1)+a montan-ester wax (e.g. Licowax E®, Hostalub WE 4® or Hostalub WE 40®).
7. Compound of the formula (I-1)+compound of the formula (II-1)+paraffin wax (e.g. Linpar 17-20® or Linpar 1416-V®).
8. Compound of the formula (I-1)+compound of the formula (II-1)+a fatty acid amid (e.g. Atmer SA 1750®, Atmer SA 1753® or Atmer SA 1759®).
9. Compound of the formula (I-2)+compound of the formula (II-1)+a Fischer-Tropsch wax (e.g. AdSperse 868®, AdSperse 500®, AdSperse 100®, EnHance® or EnHance FG®).
10. Compound of the formula (I-2)+compound of the formula (II-1)+a Ziegler-Natta polyethylene wax (e.g. Licowax PE 130®, Licowax PE 190® or Licowax PE 520®).
11. Compound of the formula (I-2)+compound of the formula (II-1)+a high pressure polyethylene wax (e.g. Licowax PE 810®, Licowax PE 820®, Licowax PE 830®, Licowax PE 840®, Epolene C 10®, Epolene C 14®, Epolene C 15®, Epolene C 16®, Epolene C 17®, Epolene C 18®, Epolene N 15®, Epolene N 20® or Epolene N 34®).
12. Compound of the formula (I-2)+compound of the formula (II-1)+a metallocene polyethylene wax.
13. Compound of the formula (I-2)+compound of the formula (II-1)+a Ziegler-Natta polypropylene wax (e.g. Licowax PP 230®).
14. Compound of the formula (I-2)+compound of the formula (II-1)+a montan-ester wax (e.g. Licowax E®, Hostalub WE 4® or Hostalub WE 40®).
15. Compound of the formula (I-2)+compound of the formula (II-1)+paraffin wax (e.g. Linpar 17-20® or Linpar 1416-V®).
16. Compound of the formula (I-2)+compound of the formula (II-1)+a fatty acid amid (e.g. Atmer SA 1750®, Atmer SA 1753® or Atmer SA 1759®).
17. Compound of the formula (I-3)+compound of the formula (II-1)+a Fischer-Tropsch wax (e.g. AdSperse 868®, AdSperse 500®, AdSperse 100®, EnHance® or EnHance FG®).
18. Compound of the formula (I-3)+compound of the formula (II-1)+a Ziegler-Natta polyethylene wax (e.g. Licowax PE 130®, Licowax PE 190® or Licowax PE 520®).
19. Compound of the formula (I-3)+compound of the formula (II-1)+a high pressure polyethylene wax (e.g. Licowax PE 810®, Licowax PE 820®, Licowax PE 830®, Licowax PE 840®, Epolene C 10®, Epolene C 14®, Epolene C 15®, Epolene C 16®, Epolene C 17®, Epolene C 18®, Epolene N 15®, Epolene N 20® or Epolene N 34®).
20. Compound of the formula (I-3)+compound of the formula (II-1)+a metallocene polyethylene wax.
21. Compound of the formula (I-3)+compound of the formula (II-1)+a Ziegler-Natta polypropylene wax (e.g. Licowax PP 230®).
22. Compound of the formula (I-3)+compound of the formula (II-1)+a montan-ester wax (e.g. Licowax E®, Hostalub WE 4® or Hostalub WE 40®).
23. Compound of the formula (I-3)+compound of the formula (II-1)+paraffin wax (e.g. Linpar 17-20® or Linpar 1416-V®).
24. Compound of the formula (I-3)+compound of the formula (II-1)+a fatty acid amid (e.g. Atmer SA 1750®, Atmer SA 1753® or Atmer SA 1759®).

The weight ratio of components (A) to (B) is for example 100/1 to 1/10, more preferably 20/1 to 1/1 and most preferably 5/1 to 2/1.

The weight ratio of components (A) to (C) is for example 1/200 to 100/1, more preferably 1/20 to 10/1 and most preferably 1/10 to 1/1.

Another embodiment of the present invention is a composition containing the components (I) and (II), wherein
component (I) is a polypropylene homopolymer, random copolymer, alternating or segmented copolymer, block copolymer or a blend of polypropylene with another synthetic polymer; and
component (II) is the additive mixture described above.

Component (I) as a polypropylene homopolymer also covers long chain branched polypropylene.

The polypropylene, can be prepared by different, and especially by the following, methods:

Catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

Component (I) is further e.g. a polypropylene random copolymer, alternating or segmented copolymer or block copolymer containing one or more comonomers selected from the group consisting of ethylene, $C_4$-$C_{20}$-α-olefin, vinylcyclohexane, vinylcyclohexene, $C_4$-$C_{20}$alkandiene, $C_5$-$C_{12}$cycloalkandiene and norbornene derivatives; the total amount of propylene and the comonomer(s) being 100%.

Polypropylene copolymer also covers long chain branched polypropylene copolymer.

Examples of suitable $C_4$-$C_{20}$α-olefins are 1-butene, 1-pentene, 1-hexene, 1-heptene, 1-octene, 1-nonene, 1-decene, 1-undecene, 1-dodecene, 1-tetradecene, 1-hexadecene, 1-octadecene, 1-eicosene and 4-methyl-1-pentene.

Examples of suitable $C_4$-$C_{20}$alkandienes are hexadiene and octadiene.

Examples of suitable $C_5$-$C_{12}$cycloalkandienes are cyclopentadiene, cyclohexadiene and cyclooctadiene.

Examples of suitable norbornene derivatives are 5-ethylidene-2-norbornene (ENB), dicyclopentadiene (DCP) and methylene-domethylene-hexahydronaphthaline (MEN).

A propylene/ethylene copolymer contains for example 50 to 99.9%, preferably 80 to 99.9%, in particular 90 to 99.9%, by weight of propylene.

A propylene copolymer wherein the comonomer is a $C_9$-$C_{20}$α-olefin such as e.g. 1-nonene, 1-decene, 1-undecene, 1-dodecene, 1-tetradecene, 1-hexadecene, 1-octadecene or 1-eicosene; $C_9$-$C_{20}$alkandiene, $C_9$-$C_{12}$cycloalkandiene or a norbornene derivative such as e.g. 5-ethylidene-2-norbornene (ENB) or methylene-domethylene-hexahydronaphthaline (MEN) contains preferably more than 90 mol %, in particular 90 to 99.9 mol % or 90 to 99 mol %, of propylene.

A propylene copolymer wherein the comonomer is a $C_4$-$C_8$α-olefin such as e.g. 1-butene, 1-pentene, 1-hexene, 1-heptene, 1-octene or 4-methyl-1-pentene; vinylcyclohexane, vinylcyclohexene, $C_4$-$C_8$alkandiene or $C_5$-$C_8$cycloalkandiene contains preferably more than 80 mol %, in particular 80 to 99.9 mol % or 80 to 99 mol %, of propylene.

Further examples of component (I) are propylene/isobutylene copolymer, propylene/butadiene copolymer, propylene/cycloolefin copolymer, terpolymers of propylene with ethylene and a diene such as hexadiene, dicyclopentadiene or ethylidene-norbornene; propylene/1-olefin copolymers where the 1-olefin is generated in situ; and propylene/carbon monoxide copolymers.

Other examples of component (I) are blends of polypropylene with propylene/ethylene copolymers, propylene/butylene copolymers, polyethylene, e.g. HDPE or LDPE; polybutene, polyisobutylene, poly-4-methylpentene or alternating or random polyalkylene/carbon monoxide copolymers. These blends contain preferably at least 50% by weight, relative to the weight of the total blend, of polypropylene.

According to a further preferred embodiment component (I) is a polypropylene copolymer, manufactured by copolymerisation of at least 75% by weight of propylene with ethylene or another alpha-olefin comonomer, which is selected from linear or branched butene, linear or branched pentene, linear or branched hexene and linear or branched octene.

Component (A) is for example present in the compositions of the invention in an amount of 0.01 to 0.5% by weight, relative to the weight of component (I), preferably 0.1 to 0.3% by weight, in particular 0.15 to 0.25% by weight.

Component (B) is for example present in the compositions of the invention in an amount of 0.01 to 0.5% by weight, relative to the weight of component (I), preferably 0.01 to 0.3% by weight, in particular 0.03 to 0.15% by weight.

Component (C) is for example present in the compositions of the invention in an amount of 0.01 to 5% by weight, relative to the weight of component (I), preferably 0.1 to 2.0% by weight, in particular 0.2 to 1.0% by weight.

The compositions of the present invention can be prepared according to the methods well established in the art. Examples are the incorporation of the components of the additive mixture into the polymer resin by powder blending of all components prior to the melt processing; addition of the additive mixture as concentrate or masterbatch to the polymer resin in pellet form; melt blending of the additive mixture in pure or concentrate form, e.g. via continuous feeders or side extruders into the molten polymer resin, etc.

The compositions of the present invention may optionally contain further additives such as those listed below.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.4. Tocopherols, for example $\alpha$-tocopherol, $\beta$-tocopherol, $\gamma$-tocopherol, $\delta$-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-($\alpha$-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis[6-($\alpha$-methylbenzyl)-4-nonylphenol], 2,2'-methylenebis[6-($\alpha$,$\alpha$-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra (5-tert-butyl-4-hydroxy-2-methylphenyl)pentane.

1.7. O-, N- and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4, 6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of $\beta$-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis[2-(3-[3,5-di-tert-butyl-4-hydroxyphenyl]-propionyloxy)ethyl]oxamide (Naugard®XL-1, supplied by Uniroyal).

1.18. Ascorbic Acid (Vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

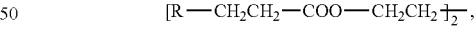

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4- hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyl-oxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2, 4-di-tert-butylphenyl)phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis (2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:
Tris(2,4-di-tert-butylphenyl)phosphite (Irgafos®168, Ciba-Geigy), tris(nonylphenyl)phosphite,

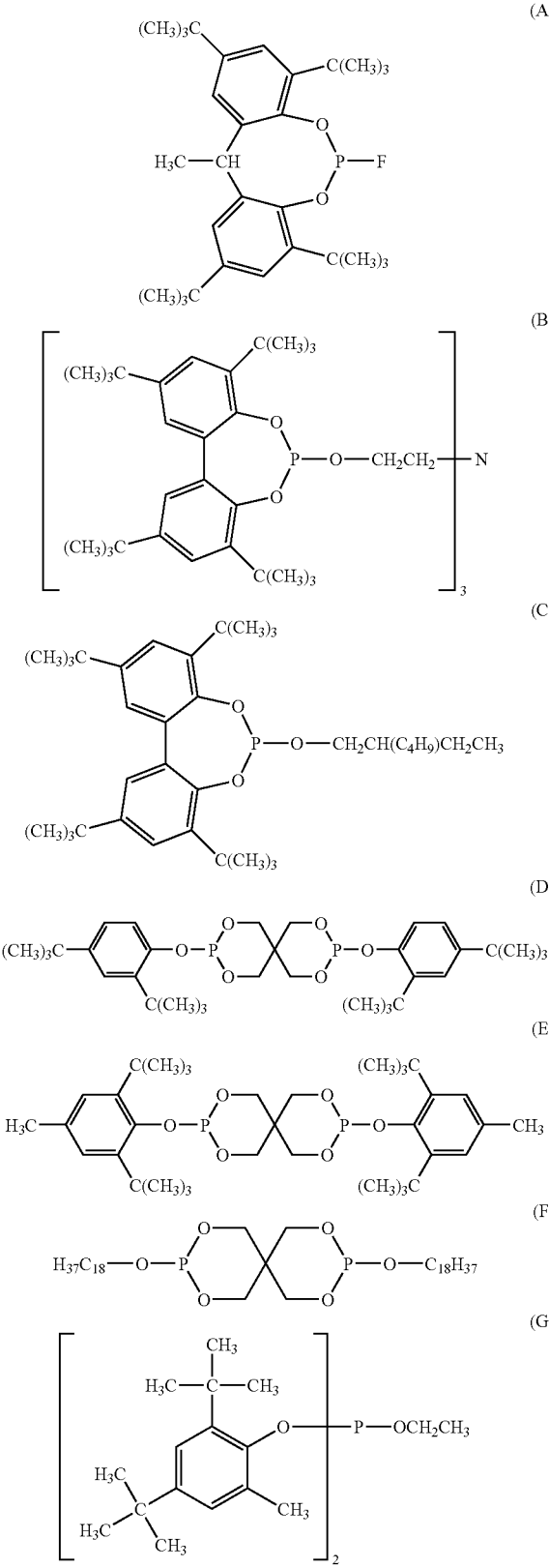

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-hepta-decynitrone, N-octadecyl-alpha-hexadecylnitrone, nitrone derived from N,N-dialkylhydroxylamine derived from hydrogenated tallow amine.

7. Thiosynergists, for example dilauryl thiodipropionate, dimistrylthiodipropionate or distearyl thiodipropionate or distearyidisulfide.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Conventional nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, pimelic acid, subaric acid, diphenylacetic acid, sodium succinate or sodium benzoate; polymeric compounds, such as ionic copolymers (ionomers).

12. Other additives, for example plasticisers, lubricants, rheology additives, catalysts, flow-control agents, optical brighteners, flame retarding agents, antistatic agents and blowing agents.

13. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

The weight ratio of the above described component (A) to the total of the conventional additives is preferably 250/1 to 1/2500, more preferably 100/1 to 1/100 and most preferably 10/1 to 1/10.

Further embodiments of the present invention which are of interest are listed below:

1. A composition containing the components (A), (B) and (D) and optionally (C), wherein component (D) is at least one antioxidant which is different from component (B), preferably selected from the antioxidants listed above under item 1.

2. A composition containing the components (A), (B) and (D) and optionally (C) wherein component (D) is at least one phenolic antioxidant which is different from component (B).

A phenolic antioxidant with a melting point below 200° C. is particularly preferred.

3. A composition containing the components (A), (B) and (D) and optionally (C) wherein component (D) is at least one phenolic antioxidant selected from esters of β-(3,5-di-tert-butyl-4-hydroxyphenyl)propionic acid or β-(5-tert-butyl-4-hydroxyphenyl)propionic acid or β-(3,5-dicyclohexyl-4-hydroxyphenyl)propionic acid, e.g. those listed above under item 1.13, 1.14 and 1.15.

4. A composition wherein
component (A) is a compound of the formula (I-2),

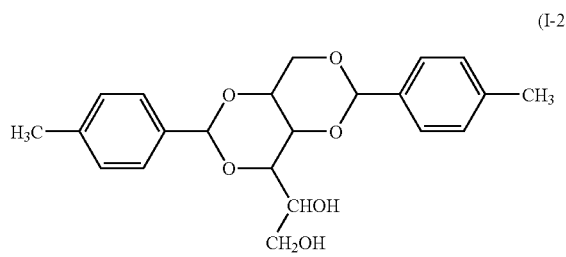

(I-2)

component (B) is a compound of the formula (II-1),

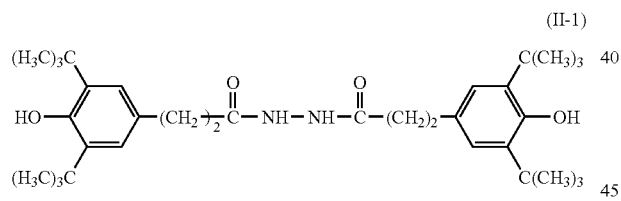

(II-1)

and
component (D) is a compound of the formula (III-1).

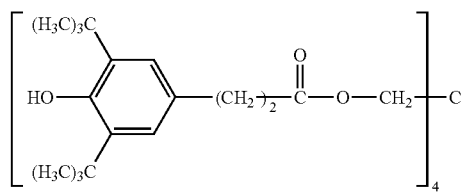

(III-1)

5. A composition containing the components (A), (B) and (D) and optionally (C) and optionally one or more further components selected from the group consisting of metal (I) or (II) salts of fatty acids, metal (II) oxides, dihydrotalcite, phosphites, phosphonites, organic sulfides and organic disulfides, e.g. those listed above under items 4, 7, 8, 10 and 11.

In the above compositions 1 to 5, for example 100 parts by weight of component (A), 5 to 35, preferably 10 to 30 or 15 to 25, parts by weight of component (B), 5 to 40, preferably 7 to 25 or 10 to 20, parts by weight of component (D) and optionally 50 to 500, preferably 50 to 400 or 50 to 300, parts by weight of component (C) may be present. If desired further components may be present, for example 10 to 50, preferably 10 to 35 or 10 to 25, parts by weight of an acid scavenger such as a metal (I) or (II) salt of a fatty acid, a metal (II) oxide or a dihydrotalcite, or 10 to 80, preferably 10 to 50 or 10 to 40, parts by weight of a phosphite, a phosphonite, an organic sulfide or an organic disulfide.

Further embodiments of the present invention are
the use of the additive mixture described above as clarifying agent for a polypropylene homopolymer, random copolymer, alternating or segmented copolymer, block copolymer or a blend of polypropylene with another synthetic polymer; and
a method for clarifying a polypropylene homopolymer, random copolymer, alternating or segmented copolymer, block copolymer or a blend of polypropylene with another synthetic polymer, which comprises incorporating therein an additive mixture as described above.

The present invention also relates to
(1) an additive mixture containing the components (A') and (C'), wherein either component (A') is the compound of the formula (I-1); and

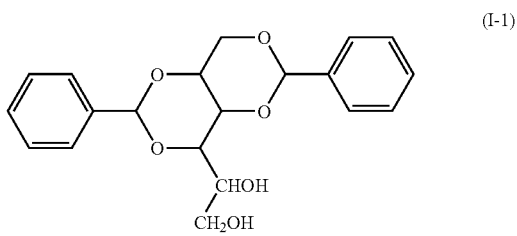

(I-1)

component (C') is at least one lubricant selected from the group consisting of synthetic waxes, preferably polyolefin waxes, in particular Fischer-Tropsch wax, high-pressure polyethylene wax, Ziegler-Natta polyethylene wax, metallocene polyethylene wax or Ziegler-Natta polypropylene wax; montan-ester wax, paraffin wax, stearamide and oleamide; or component (A') is the compound of the formula (I-2); and

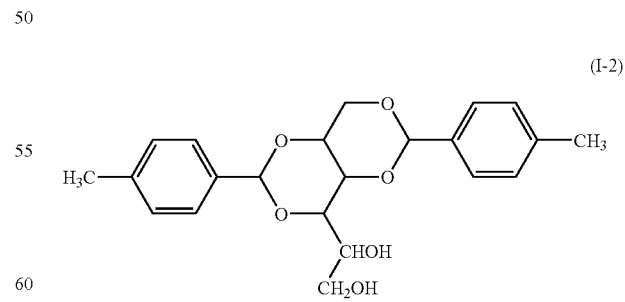

(I-2)

component (C') is at least one lubricant selected from the group consisting of synthetic waxes, preferably polyolefin waxes, in particular Fischer-Tropsch wax, high-pressure polyethylene wax, Ziegler-Natta polyethylene wax, metallocene polyethylene wax or Ziegler-Natta polypropylene wax; montan-ester wax, paraffin wax, stearamide, erucamide and oleamide;
as well as to
(2) an additive mixture containing the components (A") and (C") wherein component (A") is the compound of the formula (I-3); and

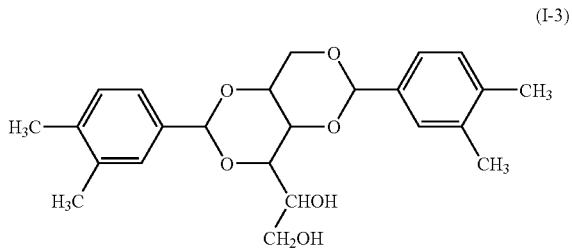

component (C") is selected from the group consisting of stearamide and oleamide.

The particular uses and applications described herein are also applicable in appropriate manner for the latter two additive mixtures.

The weight ratios and concentrations given for components (A), (C) and (I) can be applied in appropriate manner for components (A'), (A"), (C'), (C"), (I') and (I") so that component (A) corresponds to component (A') or (A"), component (C) corresponds to component (C') or (C") and component (I) corresponds to component (I') or (I").

Further examples of specific additive mixtures of the present invention are

1. Compound of the formula (I-1)+a Fischer-Tropsch wax (e.g. AdSperse 868®, AdSperse 500®, AdSperse 100®, EnHance® or EnHance FG®).
2. Compound of the formula (I-1)+a Ziegler-Natta polyethylene wax (e.g. Licowax PE 130®, Licowax PE 190® or Licowax PE 520®).
3. Compound of the formula (I-1)+a high pressure polyethylene wax (e.g. Licowax PE 810®, Licowax PE 820®, Licowax PE 830®, Licowax PE 840®, Epolene C 10®, Epolene C 14®, Epolene C 15®, Epolene C 16®, Epolene C 17®, Epolene C 18®, Epolene N 15®, Epolene N 20® or Epolene N 34®).
4. Compound of the formula (I-1)+a metallocene polyethylene wax.
5. Compound of the formula (I-1)+a Ziegler-Natta polypropylene wax (e.g. Licowax PP 230®).
6. Compound of the formula (I-1)+a montan-ester wax (e.g. Licowax E®, Hostalub WE 4® or Hostalub WE 40®).
7. Compound of the formula (I-1)+paraffin wax (e.g. Linpar 17-20® or Linpar 1416-V®).
8. Compound of the formula (I-1)+stearamide, erucamide or oleamide (e.g. Atmer SA 1750®, Atmer SA 1753® or Atmer SA 1759®).
9. Compound of the formula (I-2)+a Fischer-Tropsch wax (e.g. AdSperse 868®, AdSperse 500®, AdSperse 100®, EnHance® or EnHance FG®).
10. Compound of the formula (I-2)+a Ziegler-Natta polyethylene wax (e.g. Licowax PE 130®, Licowax PE 190® or Licowax PE 520®).
11. Compound of the formula (I-2)+a high pressure polyethylene wax (e.g. Licowax PE 810®, Licowax PE 820®, Licowax PE 830®, Licowax PE 840®, Epolene C 10®, Epolene C 14®, Epolene C 15®, Epolene C 16®, Epolene C 17®, Epolene C 18®, Epolene N 15®, Epolene N 20® or Epolene N 34®).
12. Compound of the formula (I-2)+a metallocene polyethylene wax.
13. Compound of the formula (I-2)+a Ziegler-Natta polypropylene wax (e.g. Licowax PP 230®).
14. Compound of the formula (I-2)+a montan-ester wax (e.g. Licowax E®, Hostalub WE 4® or Hostalub WE 40®).
15. Compound of the formula (I-2)+paraffin wax (e.g. Linpar 17-20® or Linpar 1416-V®).
16. Compound of the formula (I-2)+stearamide, erucamide or oleamide (e.g. Atmer SA 1750®, Atmer SA 1753® or Atmer SA 1759®).

The present invention further relates to a composition containing the components (I'''), (A''') and (C''') wherein
component (I''') is a polypropylene homopolymer or a polypropylene copolymer, manufactured by copolymerisation of at least 75% by weight of propylene with ethylene or another alpha-olefin comonomer, which is selected from linear or branched butene, linear or branched pentene, linear or branched hexene and linear or branched octene;
component (A''') is the compound of the formula (I-3); and

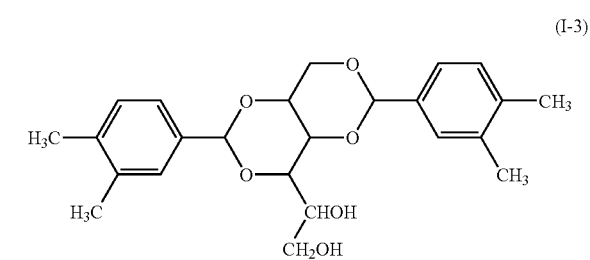

component (C''') is selected from the group consisting of Fischer-Tropsch wax, high-pressure polyethylene wax, Ziegler-Natta polyethylene wax, metallocene polyethylene wax, Ziegler-Natta polypropylene wax, montan-ester wax, paraffin wax, stearamide, erucamide and oleamide.

The weight ratios and concentrations given for components (A), (C) and (I) can be applied in appropriate manner for components (A'''), (C'''), and (I'''). The applications and uses described herein also apply to the latter composition.

The polymer resin compositions according to the present invention can be advantageously used for the preparation of various shaped articles. Examples are:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, portable phone, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Sanitary articles, in particular shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded plates, glazing for buildings (monolithic, twin or multiwall), aircraft, schools, extruded sheets, window film for architectural glazing, train, transportation, sanitary articles, and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sunshields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), BOPP, BOPET, bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, nanocomposites, dolomite, silicates, glass, asbestos).

Thus, a preferred embodiment of the present invention relates to shaped articles, in particular containers or boxes for food packaging and storage, containers or boxes for non-food packaging, medical devices and appliances, films for packaging, bottles and cups for beverages, any of which are based on plastic resin compositions as described above.

A molded article is preferred. The molding is in particular performed by injection-, blow-, compression- or rotational-molding, by thermoforming or extrusion.

A further preferred embodiment of the present invention relates to a monoaxially-oriented film or a biaxially-oriented film which has been formed by stretching a cast film based on resin compositions as described above.

A multilayer system in which one or more layers contain a resin composition as described above is also of significance in the sense of the present invention.

The presence of an additive mixture according to the instant invention facilitates the processing and improves the homogeneity of additives' distribution in a polymer.

Thus, further embodiments of the present invention relate to
- the use of an additive mixture as described herein as processing aid; and
- to a method for improving the processibility of a polymer which comprises incorporating and dispersing therein an additive mixture as described.

The following example describes the present invention in more detail. All parts and percentages are given by weight unless indicated otherwise.

STRUCTURAL FORMULAE OF COMPOUNDS USED IN THE FOLLOWING EXAMPLES

Compound (I-2):

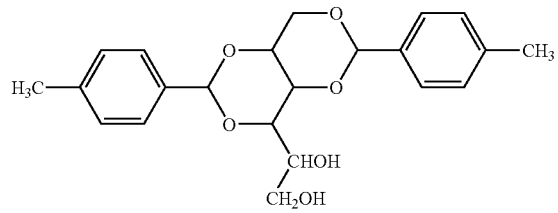

Compound (II-1):

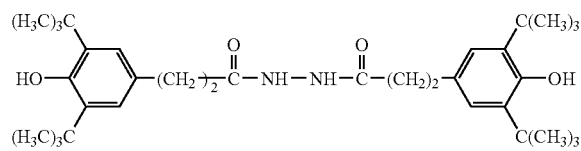

Compound (III-1):

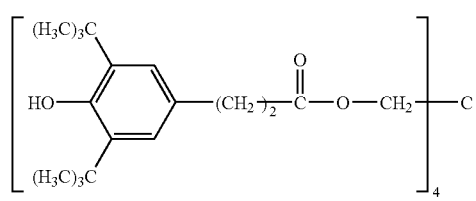

Example 1

Powdery propylene-ethylene copolymer (PP raco) with a melt flow index of 12 dg/min (measured at 230° C. and 2.16 kg) is mixed with calcium stearate, IRGANOX B 215® (=tris [2,4-di-tert-butylphenyl]phosphite and pentaerythrityl tetrakis[3-(3,5-di-tert-butyl-4-hydroxyphenyl)propionate] in a weight ratio of 2:1), Compound (I-2), Fischer-Tropsch wax (AdSperse 868®) and Compound (II-1) in a Henschel mixer. Then, the formulations are compounded twice on a Berstorff ZE 25x46D® at 250° C. The granules obtained after compounding are used for injection molding on Arburg 320 S® at 240° C. to produce 1 mm plaques. Haze, clarity and transmittance of the plaques are measured on a Haze-Gard plus (BYK Gardner®) according ASTM D1003 and the yellowness Index is measured on a datacolor machine according ASTM D1925.

|  | Formulation |
|---|---|
| PP raco | 2.0 kg |
| Ca-stearate | 750 ppm |
| Irganox B 215 (RTM) | 1000 ppm |
| Compound (I-2) | 2000 ppm |
| AdSperse 868 (RTM) | 5000 ppm |
| Compound (II-1) | 200 ppm |
| Haze | 14.78 |
| Yellowness Index | 1.07 |

Example 2

A powdery mixture of 100 parts of compound (I-2), 20 parts of compound (II-1) and 11 parts of compound (III-1) is agitated in a ball mill operated at 180-220 rpm under ambient conditions for 3 hours. The appearance of the resulting product as white powder differs from the originating powdery mixture by the significantly increased bulk density, better flow and feeding behavior as well as the reduced extend of dusting, bridging and agglomeration. Furthermore, its microscopic homogeneity becomes apparent in optical micrographs and, particularly, by SEM (scanning electron microscope) investigations clearly illustrating the coating effect of the compound (III-1) used.

After incorporation into polypropylene by the usual means commonly known and practiced in the art (powder blending of the aforementioned composition with polypropylene fluff followed by compounding at 230° C. and subsequent injection molding into 1 mm plaques), finished articles are obtained with excellent clarity (i.e. low haze) without any specks or white bits, high gloss and stiffness and free from bubbles and malodorants, which had been associated before with the use of clarifiers of the sorbitol type (compounds of the formula (I)).

Since it is obvious for those skilled in the art to vary the experimental procedure given above, this example exhibits just ONE possibility to practice the inventive compositions; but it is not intended herewith to limit in any way the scope of the invention. For example, alternative methods to apply coatings on the primary or agglomerated particles of sorbitol based clarifiers are well known in principal from the prior art; e.g. from EP-A-522,558 or EP-A-651,007 or EP-A-962,459, where polar or unpolar solvents are used to dissolve or disperse the binding agent therein and to uniformly coat the clarifier particles subsequently.

Also the teachings of DE-A-3,219,298 or EP-A-964,029, where high-speed/high-shear mixing and extrusion techniques, respectively, are recommended to produce the desired coated clarifier particles, are suited to practice the current invention. Such methods and further variations thereof can be applied on the scope of the inventive formulations and are incorporated herewith by reference.

The invention claimed is:

1. A composition containing components (I) and (II) wherein component (I) is a polypropylene homopolymer, random copolymer, alternating or segmented copolymer, block copolymer or a blend of polypropylene with another synthetic polymer; and component (II) is an additive mixture containing (A) at least one compound selected from the group consisting of formulae (I-1), (I-2) and (I-3)

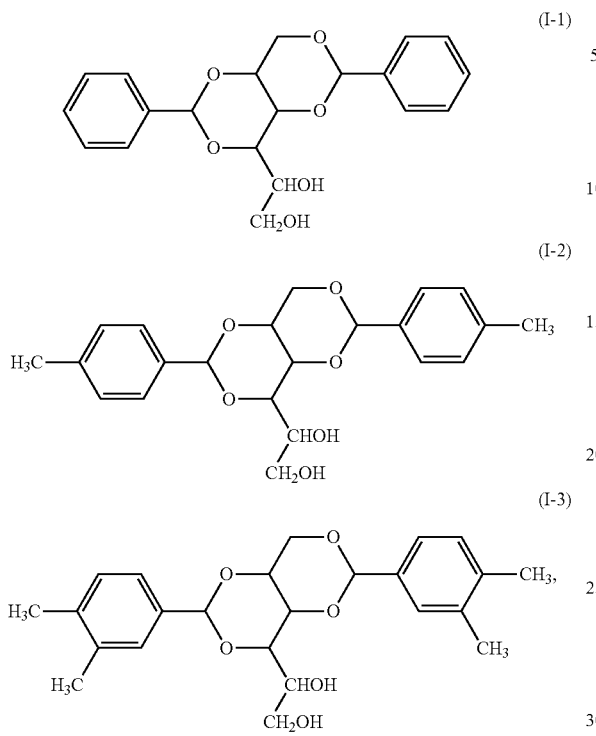

(B) a compound of formula (II-1)

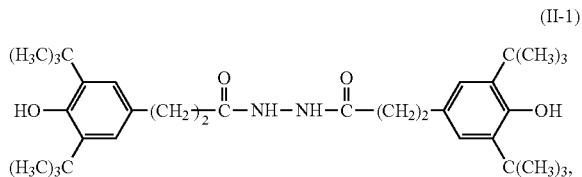

(C) at least one lubricant selected from the group consisting of Fischer-Tropsch wax, high-pressure polyethylene wax, Ziegler-Natta polyethylene wax, metallocene polyethylene wax, Ziegler-Natta polypropylene wax, stearamide, erucamide and oleamide, wherein the Fischer-Tropsch wax, high-pressure polyethylene wax, Ziegler-Natta polyethylene wax, metallocene polyethylene wax and Ziegler-Natta polypropylene wax have a molecular weight Mw of more than 800 g/mol and less than 20,000 g/mol and (D) at least one phenolic antioxidant selected from the group consisting of esters of β-(3,5-di-tert-butyl-4-hydroxyphenyl)propionic acid, β-(5-tert-butyl-4-hydroxyphenyl)propionic acid and β-(3,5-dicyclohexyl-4-hydroxyphenyl)propionic acid.

2. A composition according to claim 1 wherein component (I) is a polypropylene homopolymer.

3. A composition according to claim 1 wherein component (I) is a polypropylene random copolymer, alternating or segmented copolymer or block copolymer, containing one or more comonomers selected from the group consisting of ethylene, $C_4$-$C_{20}$α-olefin, vinylcyclohexane, vinylcyclohexene, $C_4$-$C_{20}$alkanediene, $C_5$-$C_{12}$cycloalkandiene and norbornene derivatives.

4. A composition according to claim 1 wherein component (I) is a polypropylene copolymer, manufactured by copolymerisation of at least 75% by weight of propylene with ethylene or another alpha-olefin comonomer, which is selected from linear or branched butene, linear or branched pentene, linear or branched hexene and linear or branched octene.

5. A composition according to claim 1, where (A) is

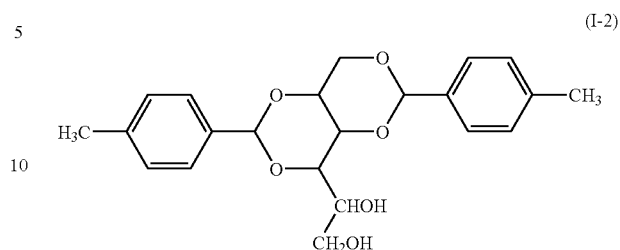

and
(D) is

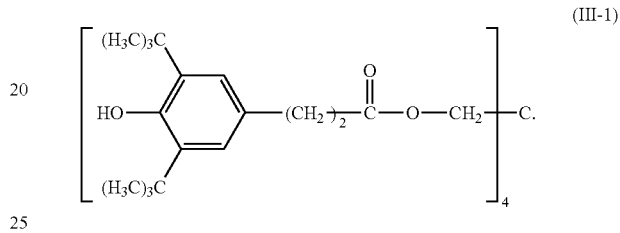

6. A composition according to claim 1 containing one or more further components selected from the group consisting of metal (I) or (II) salts of fatty acids, metal (II) oxides, hydrotalcite, phosphites, phosphonites, organic sulfides and organic disulfides.

7. A method for clarifying a polypropylene homopolymer, random copolymer, alternating or segmented copolymer, block copolymer or a blend of polypropylene with another synthetic polymer, which method comprises incorporating therein an additive mixture containing (A) at least one compound selected from the group consisting of formulae (I-1), (I-2) and (I-3)

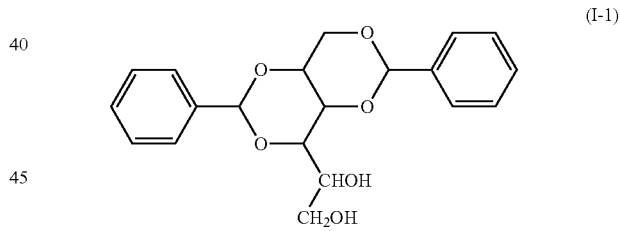

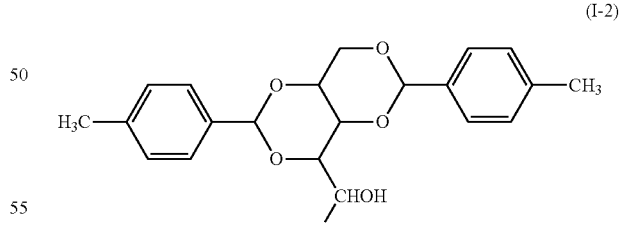

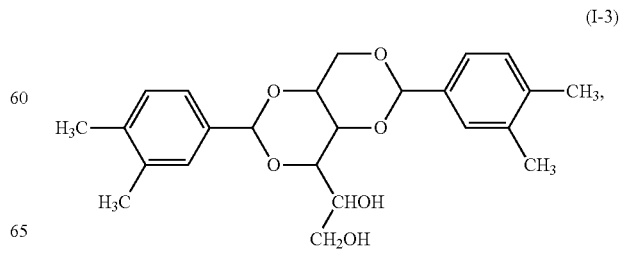

(B) a compound of formula (II-1)

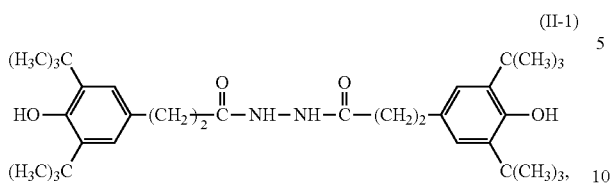

(C) at least one lubricant selected from the group consisting of Fischer-Tropsch wax, high-pressure polyethylene wax, Ziegler-Natta polyethylene wax, metallocene polyethylene wax, Ziegler-Natta polypropylene wax, stearamide, erucamide and oleamide, wherein the Fischer-Tropsch wax, high-pressure polyethylene wax, Ziegler-Natta polyethylene wax, metallocene polyethylene wax and Ziegler-Natta polypropylene wax have a molecular weight Mw of more than 800 g/mol and less than 20,000 g/mol and (D) at least one phenolic antioxidant selected from the group consisting of esters of β-(3,5-di-tert-butyl-4-hydroxyphenyl)propionic acid, β-(5-tert-butyl-4-hydroxyphenyl)propionic acid and β-(3,5-dicyclohexyl-4-hydroxyphenyl)propionic acid.

* * * * *